United States Patent [19]
Schoolcraft

[11] Patent Number: 5,237,587
[45] Date of Patent: Aug. 17, 1993

[54] PSEUDO-NOISE MODEM AND RELATED DIGITAL CORRELATION METHOD

[75] Inventor: Ralph W. Schoolcraft, Rancho Palos Verdes, Calif.

[73] Assignee: Magnavox Electronic Systems Company, Fort Wayne, Ind.

[21] Appl. No.: 979,123

[22] Filed: Nov. 20, 1992

[51] Int. Cl.$^5$ .................................. H04K 1/00
[52] U.S. Cl. .................................. 375/1; 380/34
[58] Field of Search .................................. 375/1; 380/34

[56] References Cited

U.S. PATENT DOCUMENTS

| | | | |
|---|---|---|---|
| 4,485,477 | 11/1984 | Nossen | 375/1 |
| 5,029,184 | 7/1991 | Andren et al. | 375/1 |
| 5,131,006 | 7/1992 | Kamerman et al. | 375/1 |
| 5,166,952 | 11/1992 | Omura et al. | 375/1 |
| 5,179,573 | 1/1993 | Paradise | 375/1 |
| 5,184,135 | 2/1993 | Paradise | 375/1 X |

OTHER PUBLICATIONS

"Fast Synchronization in a Spread Spectrum System Bases on Acoustoelectric Convolvers", Brodtkorb, D. et al.; 1978 Ultrasonics Symp Proc IEEE (375/1).

Primary Examiner—Tod Swann
Attorney, Agent, or Firm—Noel F. Heal; Richard T. Seeger

[57] ABSTRACT

A pseudo-noise (PN) correlation and demodulation method and apparatus, in which received signals are correlated with locally generated PN codes and correlation measurements are maintained for multiple time bins corresponding to signals received over possible multiple paths. Instead of selecting one or a small number of significant correlation measurements to control data demodulation, the method of the invention performs data demodulation over the multiple time bins, and then selects data values corresponding to significant correlation measurements and combines the selected data values, weighting them in accordance with their relative strengths a determined during correlation. Use of the invention provides improved performance in terms of signal quality and continuity in the presence of multipath conditions. Careful selection of design parameters allows the improved performance to be obtained in a compact and easily portable implementation including transmitter and receiver modules.

20 Claims, 6 Drawing Sheets

* F=PN CHIPPING RATE

FIG. 8

PSEUDO-NOISE MODEM AND RELATED DIGITAL CORRELATION METHOD

BACKGROUND OF THE INVENTION

This invention relates generally to the transmission and reception of data in spread spectrum systems and, more particularly, to improvements in digital processing techniques for use in a pseudo-noise (PN) receiver. Digital modulation techniques for communication are well known, and include phase shift keying (PSK), where a constant amplitude carrier signal is selectively reversed in phase to indicate a binary change of state of a data signal. In quadriphase phase shift keying (QPSK), the modulated carrier can assume any of four phase states, as determined by pairs of data bits.

For security and other reasons, a modulated carrier signal may also be subject to spread spectrum modulation. A spread spectrum signal is, as the name implies, spread over a wide bandwidth and is relatively immune to eavesdropping and jamming. A technique uses a pseudo-random (PN) code sequence to obtain the desired spectral spreading. A PN sequence is binary sequence that repeats itself after a large number cycles. Thus the binary numbers in the sequence are not truly random, but if the repetition cycle of the sequence is long enough its spectrum shares many of the properties of random electromagnetic noise. In the context of a data transmitter, PN modulation may be effected by simply passing the data stream and the PN code sequence through an exclusive OR gate, to achieve PSK modulation of the data onto the PN code. Data bits are either inverted or not, depending on the presence or absence of a logical "1" bit in the PN code. The data symbol rate is typically many times slower than the PN code rate (referred to as the PN "chip" rate). The resulting digital data stream is a PN code modulated by the slower data symbol stream, and is used to modulate a carrier signal in accordance with a digital modulation technique, such as QPSK, and the modulated carrier is transmitted. The present invention is concerned with systems of this general type, and particularly with such systems in which there may be multiple transmission paths between a transmitter and a receiver.

Receiving and demodulating signals that have been subject to PN modulation requires that the same PN code sequence be generated in the receiver, and correlated with received signals to extract the data modulation. One type of correlation technique employs a digital matched filter to compare the received digital signal with the locally generated version of the PN code. The digital filter produces an in-phase (I) signal and a quadrature (Q) signal from which a digital demodulator (such as a DPSK demodulator) can derive data values. Another function of the digital matched filter is to produce correlation measurements from which synchronization (sync) signals can be generated and used to handle multipath components in the received data signals. To better understand this aspect of PN-modulated data transmission, some further background is needed.

Multipath components arise in rf communication systems of various types when a receiving antenna detects signals arriving non-simultaneously over different paths. Multiple transmission paths may result from various causes, such as from atmospheric effects, or reflections from buildings or geographical features. In any event, a transmitted signal may produce multiple received signals of different strength. Conventionally, multipath errors are resolved in a PN correlator by selecting one or two correlation measurements having the highest signal strength, and using only these measurements during subsequent signal processing in which data demodulation is completed. For example, a PN correlator may generate an output spanning a few microseconds, long enough to produce multiple correlation output peaks resulting from multipath errors. Typically a single correlation peak value is detected in a sync detector, which integrates over a suitably large number of symbols, and a time epoch associated with the detected correlation peak is used to control input to a data demodulator.

A practical characteristic of transmissions involving multipath errors is that the multipath conditions may vary rapidly with time, especially if the transmitter or receiver, or both, are in motion, or if a source of multipath reflections is in motion. Therefore, a path that provides the maximum signal strength at a receiver at one instant in time may fade or disappear in the next instant, to be replaced by other signal paths providing different signal strengths. Ideally, it would be desirable to keep track of all the principal multipath signals, above some threshold, to provide continuity and quality of reception. Prior to the present invention, receivers attempting to achieve this goal have necessarily been extremely complex, bulky, and correspondingly costly to manufacture. No portable transceivers available prior to the present invention are believed to be capable of performing PN correlation measurements for multiple correlation peaks resulting from multiple transmission paths. The present invention is directed to this end.

SUMMARY OF THE INVENTION

The present invention relates principally to a pseudo-noise (PN) correlator and associated multipath combiner for use in a PN modulator/demodulator (modem). In accordance with the invention, correlation measurements are taken for multiple successive time increments, or time "bins," across a segment of a received PN signal. The multiple time increments together span a time window in which possible multipath signal transmissions may be detected. The multiple correlation measurements are taken over successive time segments and then integrated over complete data symbol time intervals, to obtain multiple coherently integrated correlation measurements for each symbol time interval. It is also an important aspect of the invention that data demodulation is performed for all of the time "bins," and then resulting multipath signal components are selected, based on the times of occurrence of peaks in the correlation measurements. The selected data values of the multipath components are then combined by weighting them in accordance with their signal strengths. The invention provides improved performance in terms of the overall transmission channel quality, and assures continuity of data reception by combining multipath signals.

Briefly, and in general terms, the method of the invention comprises the steps of correlating digitized samples of the received signals with a locally generated PN code sequence, to obtain correlation measurements over a plurality of consecutive time bins covering possible multipath conditions; demodulating the received signals to obtain potential baseband data relating to all of the time bins; filtering the baseband data based on the correlation data obtained for the plurality of time bins, to obtain usable baseband data associated with correlation measurements indicative of usable signal components; and combining the usable baseband data components in proportion to their relative signal strengths. Simultaneous use of multipath signal components improves the overall signal quality and assures continuity of data reception in a dynamic multipath transmission medium.

Data symbols to be derived from the received signals may change state at a data symbol rate, and each received symbol persists for a data symbol interval. The correlating step operates on successive segments of the received signal, and there is an integral number of segments in each data symbol interval. More specifically, the correlating step includes correlating a first segment of locally generated PN code with a moving segment of the received signal, to obtain a first set of correlation measurements over multiple time bins relating to the signal segment, correlating successive subsequent segments of the locally generated PN code with successive moving segments of the received signal, to obtain multiple sets of correlation measurements similar to the first set, and integrating the first and successive sets of correlation measurements over all of the segments in each data symbol interval. Thus for each data symbol interval, the correlation process yields a set of correlation measurements, such as sixty-four measurements, integrated over all segments in the symbol interval. In the presently preferred embodiment of the invention, there are sixteen segments in each symbol interval, although this is not a critical limitation.

In the disclosed embodiment of the invention, the correlating step further comprises the steps of generating from the correlation measurements a set of in-phase (I) and quadrature (Q) signals for each data symbol interval; and generating from the I and Q signals a set of correlation magnitude signals approximately proportional to $(I^2+Q^2)$, for each data symbol interval.

To generate sync signals relating to peaks in the correlation measurements, the method further comprises the steps of integrating the correlation magnitude signals over a selected number of data symbol intervals; detecting peaks in the integrated correlation magnitude signals; and generating from the detected peaks, sync signals indicative of the relative times of arrival associated with the multipath components.

In the preferred embodiment of the invention, the step of demodulating the received signals includes deriving multiple data values from the I and Q signals obtained for each data symbol interval, the multiple data values being associated with the times of arrival of multipath components. Further, the step of combining the usable baseband data components in proportion to their relative signal strengths includes accumulating selected ones of the multipath data values, under control of the generated sync signals, whereby the selected multipath data values are accumulated only if they correspond in time to significant correlation measurements.

A number of aspects of the manner in which receiver functions are implemented contribute to the desirable simplicity of the implementation, which can then be conveniently reduced in size and cost. One of these aspects involves the step of generating sets of correlation magnitude signals approximately proportional to $(I^2+Q^2)$. In the preferred embodiment of the invention, this step includes determining the magnitudes of the I and Q signals, without regard to sign, and adding the magnitudes of the I and Q signals.

The invention may also be defined as a method for processing received radio-frequency (rf) signals that have been modulated using a form of quadriphase phase shift keying (QPSK), with PN codes and with data values. The method comprises the steps of down-converting received rf signals to a lower frequency; converting the received signals into two streams of digitized orthogonal components; correlating the orthogonal components with a locally generated PN code sequence, to produce correlation measurements over a plurality of time bins corresponding to a time segment of the received signals; and integrating the correlation measurements over multiple time segments to provide coherent integrated correlation measurements over each successive data symbol interval. The method further includes the steps of generating from the integrated correlation measurements, at the end of each data symbol interval, in-phase (I) and quadrature (Q) component signals for each of the plurality of time bins, and generating a corresponding set of correlation magnitude signals of which there is one for each of the time bins; then using a DPSK demodulator to derive data values from each pair of I and Q component signals in each set of such signals. Data values are derived for each of the time bins, regardless of the possible invalidity of data values in many of the bins. The method further includes generating sync signals from the correlation magnitude signals exceeding a preselected threshold, to identify the time bins relating to multiple received signal paths; and combining the data values obtained from the DPSK demodulator, under control of the sync signals. Only data values identified by the correlation measurements are combined, and weighted in accordance with their correlation magnitudes, to provide for improved quality and continuity of received data.

In terms of novel apparatus, the invention includes correlation means, for correlating digitized samples of the received signals with a locally generated PN code sequence, to obtain correlation measurements over a plurality of consecutive time bins covering possible multipath conditions; demodulation means, for demodulating the received signals to obtain potential baseband data relating to all of the time bins; means for filtering the baseband data based on the correlation data obtained for the plurality of time bins, to obtain usable baseband data associated with correlation measurements indicative of usable signal components; and signal combining means, for combining the usable baseband data components in proportion to their relative signal strengths. Other more specific definitions of the invention may also be made in apparatus form.

It will be appreciated from the foregoing that the present invention represents a significant advance in the field of digital communication using PN modulation. In particular, the invention provides a novel technique for handling multipath transmissions, wherein correlation measurements are maintained over multiple time bins and data demodulation is also performed over multiple time bins, to yield multiple data values that can be conveniently filtered and combined in accordance with their relative multipath signal strengths. Other aspects and advantages of the invention will become apparent from the following more detailed description, taken in conjunction with the accompanying drawings.

DESCRIPTION OF THE PREFERRED EMBODIMENT

As shown in the drawings for purposes of illustration, the present invention is concerned with improvements in data transmission and reception using pseudo-noise (PN) modulation. PN modulation has been used in data transmission to spread the spectrum of the transmitted signals over a wide bandwidth. Spectral spreading of the signals makes them more immune to eavesdropping and accidental or deliberate interference. A disadvantage of PN modulation is that demodulation equipment required in a receiver tends to be complex and bulky unless design compromises are made. One such compromise relates to the manner in which multipath signals are handled. Multipath transmissions arrive at the receiver at slightly different times and PN demodulation requires complex circuitry if all potential signal paths are to be considered throughout the PN demodulation and data demodulation process. Typically, the received PN signals are correlated with a locally generated PN code sequence and, if multiple correlation peaks are detected, the strongest is selected as a time reference for use in data demodulation. This approach reduces the complexity of receiver circuitry, but at the expense of possible loss of data if the selected correlation peak is replaced by another one resulting from a different transmission path.

Figures 1, 2:
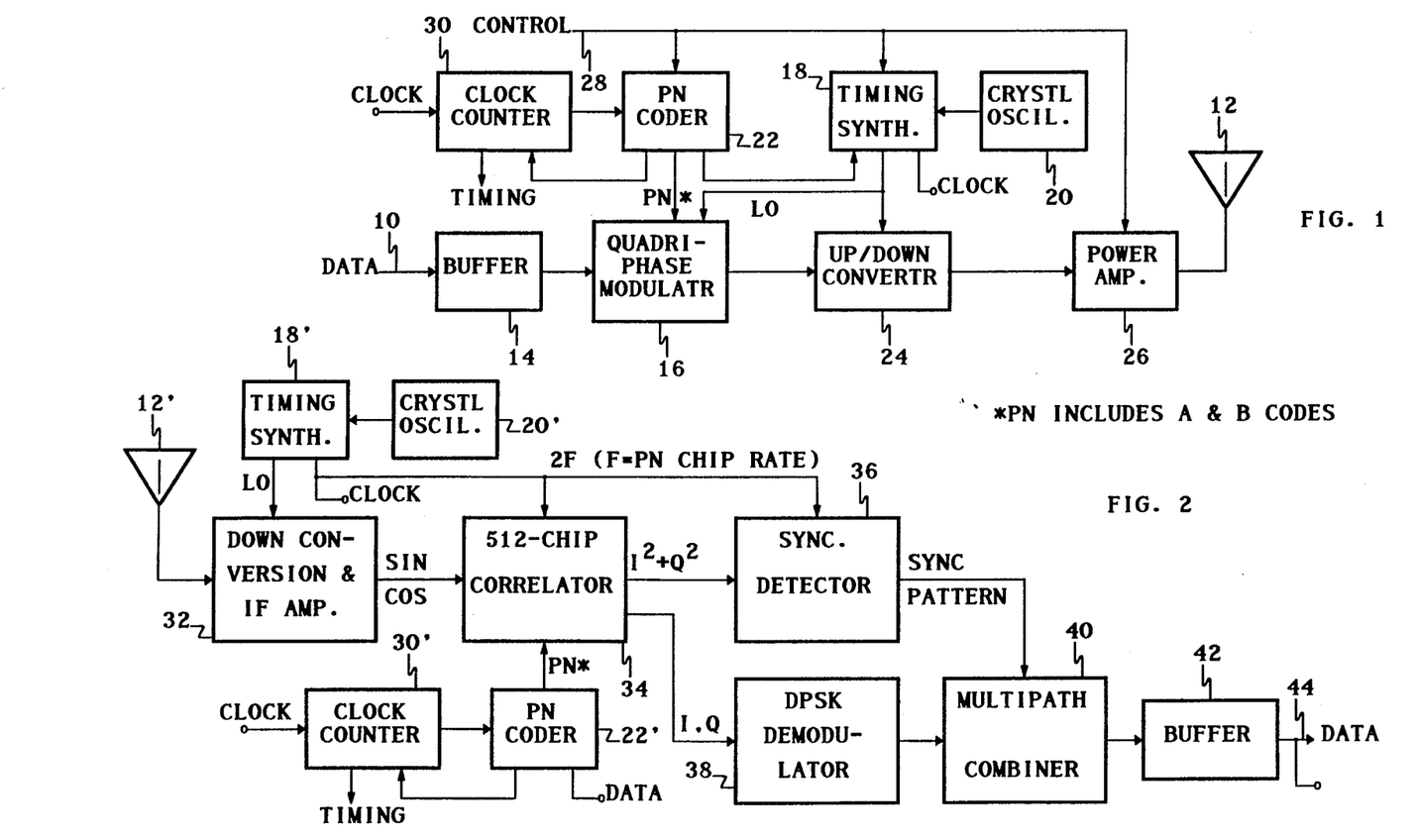
FIG. 1 is a block diagram of a transmitter employing quadriphase pseudo-noise (PN) modulation and phase shift keying (PSK) data modulation.
FIG. 2 is a block diagram of a receiver for receiving and demodulating signals received from the transmitter of FIG. 1.

FIGS. 1 and 2 depict a transmitter and receiver, respectively, using phase shift keying (PSK) data modulation and quadriphase phase shift keying (QPSK) PN modulation. The functional blocks in these figures are general enough that they are descriptive both of the present invention and of numerous transmitters and receivers of the prior art.

The function of the transmitter (FIG. 1) is to convert a data stream, received over line 10, to a modulated radio-frequency (rf) signal for transmission from an antenna 12. The data signals are shown as being input to a buffer 14 in which a slow PN code may be added, but this has no direct relevance to the present invention. Slow PN coding may be employed to facilitate acquisition of the signal at the receiver, but in the description of the receiver that follows it will be assumed that acquisition has been achieved. The data then passes into a quadriphase modulator 16 in which two types of modulation take place. A timing synthesizer 18, driven by a crystal oscillator 20, generates local oscillator (LO) signals which form the carrier signal to be transmitted. In PSK data modulation, the phase of the carrier signal is modulated in accordance with the state of the data signals, and can assume one of two phase states. In addition to data modulation performed in modulator 16, QPSK PN modulation is performed by changing the phase of the carrier signal in accordance with the state of two PN binary sequences, generated in a PN coder 22. Basically, QPSK PN modulation means that the phase of the carrier can assume any of four phase states as a function of the two PN code sequences. The present implementation uses staggered or offset QPSK (referred to as SQPSK or OQPSK), in which one of the code sequences is delayed by half of a "chip" interval. The PN code rate is faster than the data rate by some fairly large factor, such as 512, so that there will be 512 potential changes of the PN sequence during the time that one data symbol is presented. The PN code bits are referred to as "chips" and, in this example, there are 512 chips of PN code for each symbol time interval.

The data modulated and PN modulated carrier signal is next processed by an up/down converter 24, the purpose of which is simply to change the frequency to a convenient one for transmission from the antenna 12. A power amplifier 26 may also be interposed between the up/down converter 24 and the antenna 12. The power amplifier 26, together with the PN coder 22 and the timing synthesizer 18, may be controlled by common line 28. For those applications involving voice data, the control line 28 may be connected to a push-to-talk switch on a microphone (not shown). The transmitter also includes a clock counter 30 that receives clock signals from the timing synthesizer and generates timing signals for the PN coder 22 and other components of the transmitter. It will be appreciated that certain types of data may require other processing functions. For example, voice data will need to be digitized before modulation. However, the present invention pertains to any type of digital data transmission using PN modulation.

The receiver (FIG. 2) also includes an antenna 12', a crystal oscillator 20' and a timing synthesizer 18'. Although these are shown as independent of the corresponding components in the transmitter, it will be understood that, in a practical embodiment, the components would be shared by the transmit and receive functions. Similarly, the receiver includes a clock counter 30' and a PN coder 22'. PN-modulated signals received through the antenna 12' are first down-converted and subjected to intermediate-frequency amplification, as shown in block 32. Output signals from this stage of the receiver are in-phase (I) and quadrature (Q) components of the received signal, also referred to as cosine signal samples and sine signal samples. These signals, still in analog form, are input to a 512-chip correlator 34, which also receives locally generated PN code sequences, referred to as A and B codes, from the PN coder 22'. The 512-chip correlator generates outputs of two types: two signals representative of the I and Q component samples of the received signal, still data modulated, and an amplitude signal representative of the instantaneous amplitude of the received signal and proportional to $(I^2+Q^2)$. The latter signal is input to a sync detector 36, which generates timing signals indicative to the relative times of occurrence of correlation peaks detected by the correlator 34.

The I and Q signals are passed to a DPSK demodulator 38. Based on successive input values of I and Q, the demodulator 38 regenerates a data stream, some of which may contain values equivalent to received electromagnetic noise. In a multipath combiner, the data values emerging from the data demodulator 38 are subject to filtering by a sync signal generated by the sync detector 36. In receivers prior to this invention, the sync detector 36 would generate a sync signal related to a single selected correlation peak, ignoring possible other multipath peaks, and the combiner 40 could more properly be referred to as a multipath selector. In any event, selected data signals may be stored temporarily in a buffer 42, before being transmitted over data line 44.

It will be understood from the foregoing general description of transmitter and receiver functions that, as in most communication systems, there are practical problems relating to acquisition of and synchronization with a received signal. Conventional solutions to these problems are assumed in this description of the present invention, which is concerned principally with the correlation of a locally generated PN code with an incoming PN-modulated signal, and the novel manner in which multipath signals are handled.

Figure 3:
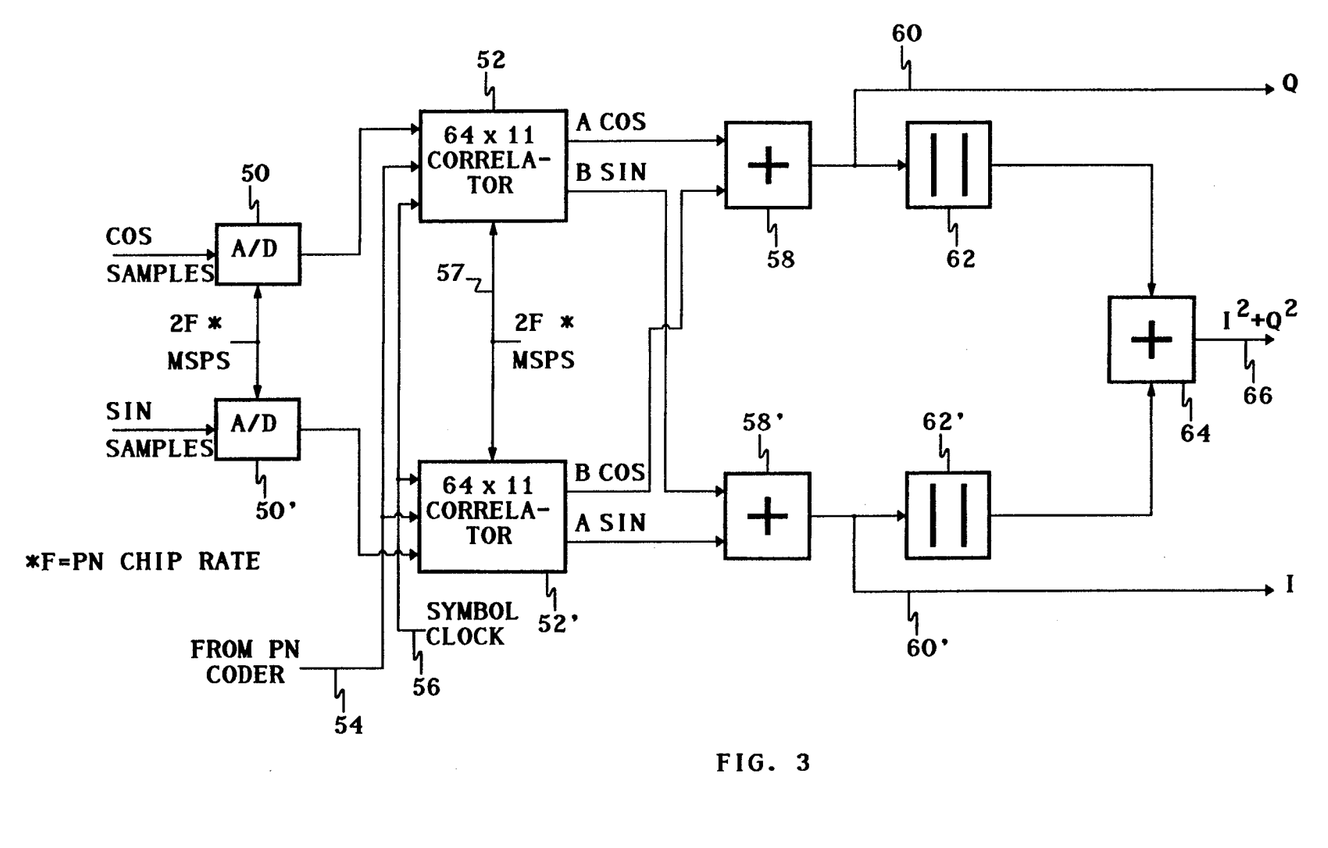
FIG. 3 is a block diagram of 512-chip PN digital matched filter correlator included in the receiver of FIG. 2 and embodying the present invention.

FIG. 3 shows the 512-chip correlator 34 in more detail. First, the sine and cosine signals are input to analog-to-digital (A/D) converters 50 and 50', which are driven by a clock signal at a rate twice the PN chip rate and produces two digital data streams at the same rate, for input to respective correlators, referred to as 64×11 correlators 52 and 52'.

In this implementation of the invention, only the most significant bit of output from the A/D converters 50, 50' is used in the correlators 52, 52'. For most applications, this is adequate, but degradation may occur in the presence of an interference signal that is frequency and phase coherent with the sampling process. In that case, the receiver may have to employ a conventional technique such as phase dithering of the sampling clock to effectively eliminate the interference, or the correlation process may have to be "deepened" to include A/D samples of 3 or 4 bits instead of just the most significant bit.

Also input to the correlators 52, 52' at the same rate is a stream of locally generated PN codes, over line 54, a symbol clock rate signal, on line 56, and a clock at twice the chip rate, on line 57. As will be explained in more detail with reference to FIG. 4, correlator 52 generates a pair of signals proportional to A cos $\theta$ and B sin $\theta$, respectively, where A and B are constants and $\theta$ is the phase angle. Similarly, correlator 52' generates a pair of signals proportional to $-A$ sin $\theta$ and B cos $\theta$, respectively. The cosine components are added in an adder circuit 58, to produce an output signal proportional to Q on line 60. Similarly, the sine components are added in another adder circuit 58', to produce an output signal proportional to I on line 60'. The required signal proportional to $I^2+Q^2$ is generated in accordance with an approximation, by taking the magnitude of the Q component, using circuit 62, and the magnitude of the I component, using circuit 62'; then combining these two magnitudes in another adder circuit 64, to produce the approximated $I^2+Q^2$ signal on line 66.

A traditional, but more costly, way to compute the required output signal would be based on the trigonometrical identity $\sin^2\theta + \cos^2\theta = 1$, but would require two signal squaring circuits. Instead, the presently preferred implementation uses the approximation $|\sin\theta| + |\cos\theta| \simeq 1$. Since the sine and cosine terms are already available, implementation of this approach requires only the two absolute value circuits 62, 62' and the adder 64. Moreover, the approximation is sufficiently accurate because of the somewhat qualitative way that the results are subsequently used in the sync detector 36. As will be described below, the sync detector integrates the results over multiple sample intervals and makes a comparison with a preselected threshold value.

Figure 4:
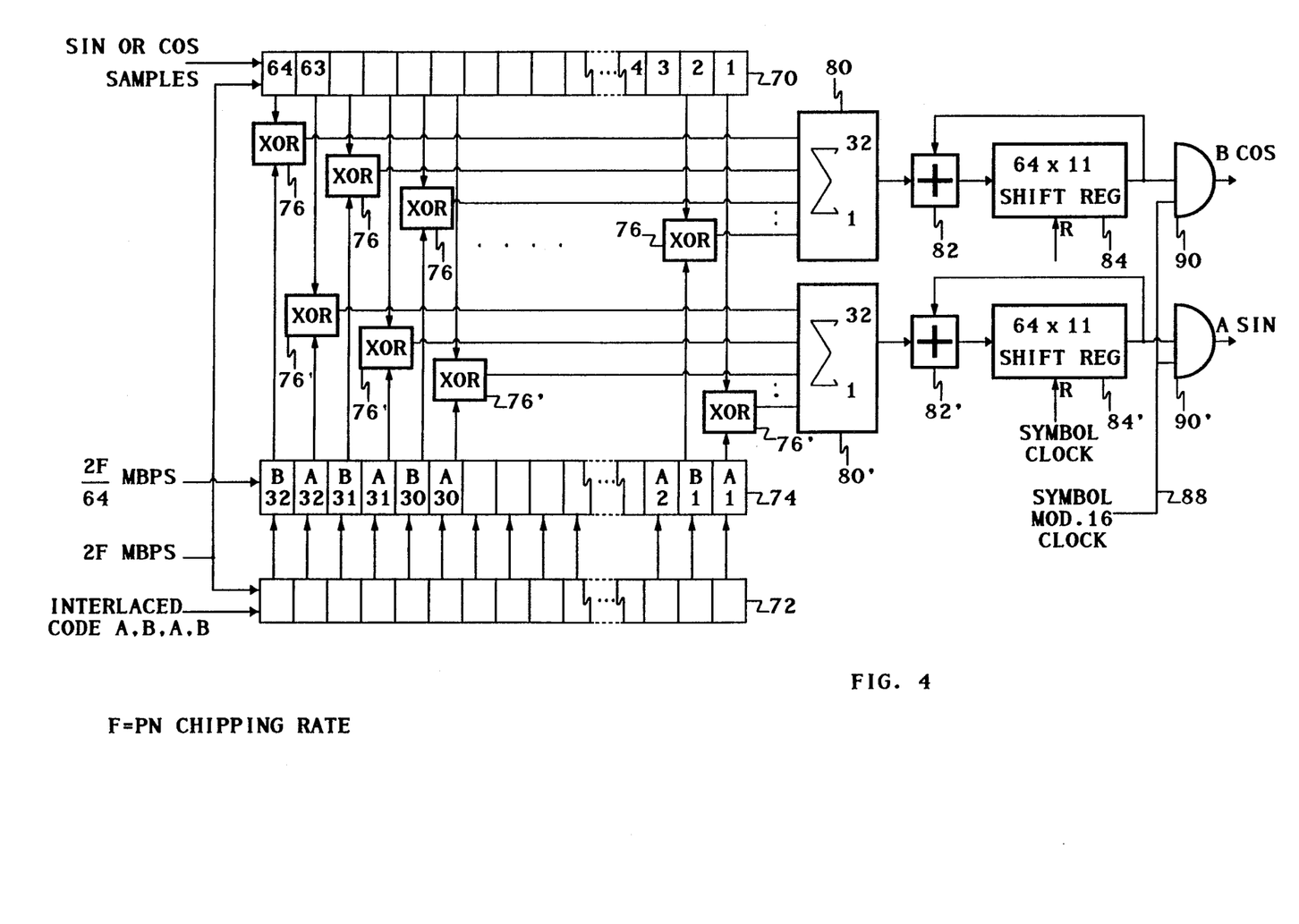
FIG. 4 is a block diagram of a 64×11 correlator, two of which are used in the 512-chip PN correlator of FIG. 3.

The two 64×11 correlators 52, 52' are identical in structure. One of these correlators is illustrated in FIG. 4, and includes a first 64-bit shift register 70 into which the sine or cosine samples are serially shifted, and a second 64-bit shift register 72 into which the two PN code sequences (A and B) are serially shifted. In the receiver, the A and B PN code sequences are supplied to the shift register 72 in interlaced form, i.e. as alternating A and B codes. Both the interlaced PN codes and the signal samples are clocked into their respective registers 72, 70, at twice the code chip rate. When register 72 is filled with a new set of sixty-four code bits, the entire register is copied in parallel to a 64-bit fixed register 74. This parallel transfer takes place every sixty-four half-chip cycles, i.e. at 1/32 of the chip rate.

Correlation also occurs at twice the chip rate, and involves a bit-by-bit comparison of the codes held stationary in register 74 and the input sample bits being shifted through register 70. At each comparison cycle, the odd-numbered bits in register 70 are compared with the A-code bits in register 74, using exclusive OR gates 76, which function as modulo-two correlators. That is to say, when the inputs are the same the output will be logical "0" and when the inputs are different the output will be a logical "1." Similarly, the even-numbered bits in register 70 are compared with the B-code bits in register 74, using another set of exclusive OR gates 76'. Each of the exclusive OR gates 76, 76' provides a one-bit match signal. The outputs of the upper set of exclusive OR gates 76 are combined in a summation circuit 80, and the outputs of the lower set of exclusive OR gates 76' are combined in another summation circuit 80'. Because there are thirty-two inputs to each of the summation circuits 80 and 80', the output of each is a quantity in the range 0–32, which requires a five-bit output line from each of the summation circuits.

The remaining portion of the correlator performs a coherent integration function, and includes two adder circuits 82, 82', and two 64×11 shift registers 84, 84'. The term "64×11" means that each of the shift registers 84, 84' has sixty-four stages or positions, and that each stage is eleven bits "wide". Thus the digital quantities shifted through the registers may be up to eleven bits long. The output of each shift register 84, 84' is fed back over line 86, 86' as an input to the corresponding adder circuit 82, 82'. The other inputs for the adders 82, 82' are derived from the summation circuits 80, 80', respectively. Although detailed timing circuitry has been omitted from the drawing for simplicity, it will be understood that the adders 82, 82' and the shift registers 84, 84' are also clocked at twice the chip rate. Thus, as correlation results emerge from the summation circuits 80, 80', they are integrated with prior results in the adder circuits 82, 82' and then shifted through the shift registers 84, 84'.

Figure 8:
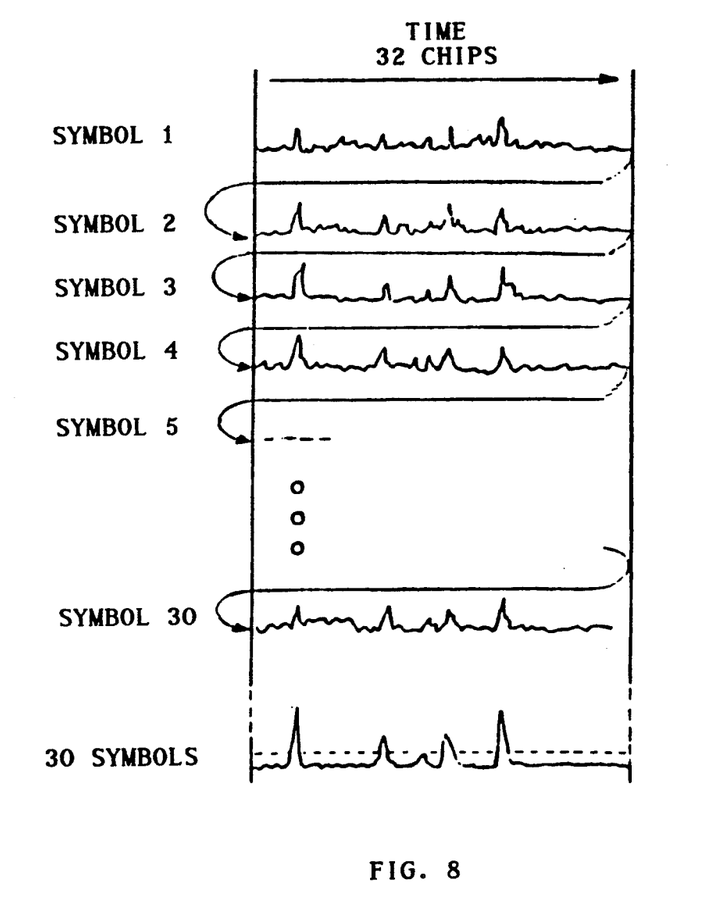
FIG. 8 is a graph showing an example of the analog equivalent of the PN correlator output for successive data symbols, wherein the output for each symbol is derived from coherent integration of sixteen time segments of thirty-two chips each, as further explained below.

FIG. 8 helps provide an intuitive understanding of how the correlator of FIG. 4 operates. At the beginning of a symbol interval, the shift registers 84, 84' are cleared, as indicated by the symbol clock signal on line 86. Then, after sixty-four half-chip cycles, the registers 84, 84' contain a set of sixty-four time-spaced accumulations from the summation circuits 80, 80'. The time interval spanning sixty-four half-chip cycles, or thirty-two chips, is referred to as a time "segment." In the illustrative embodiment, there are sixteen segments per symbol interval. At the end of subsequent segments after the first one in a symbol interval, the shift registers 84, 84' contain digital quantities indicative of an accumulation of correlation results over all of the segments in the symbol interval processed up to that point. After sixteen segments have been processed, the shift registers 84, 84' contain quantities indicative of the accumulated correlation results over all sixteen segments in the symbol interval. The first "trace" of FIG. 8 is an analog equivalent of these accumulated correlation results taken over sixteen segments. Each "point" in the trace represents an accumulation of sixteen sets of thirty-two correlation bits from the exclusive OR gates 76. It will be understood, however, that there is no real analog implementation corresponding to FIG. 8, which is solely for purposes of explanation.

The accumulated correlation results in the shift registers 84, 84' are shifted out of the registers at the end of each symbol interval, for further processing. This step may be accomplished by means of a "symbol modulo-16" clock signal, as shown in line 88, and a pair of multibit-wide AND gates 90, 90'. The timing signal on line 88 provides an enabling signal to the AND gates only during the sixteenth and last segment of the symbol interval. Therefore, during the last segment of each symbol interval, the accumulated correlation results for that interval are gated out of the shift registers 84, 84', as well as being fed back to the adder circuits 82, 82'. In an alternative implementation (not shown), the accumulated correlation results are gated from the outputs of the adders 82, 82' at the end of the symbol time interval.

It will be recalled from the discussion of FIG. 3 that the data quantities output from the 64×11 correlators 52, 52' are used to generate I and Q signals, and to generate an approximated $I^2+Q^2$ signal. The processing of the $I^2+Q^2$ signal in the sync detector 36 will now be discussed with reference to FIG. 5.

Figure 5:
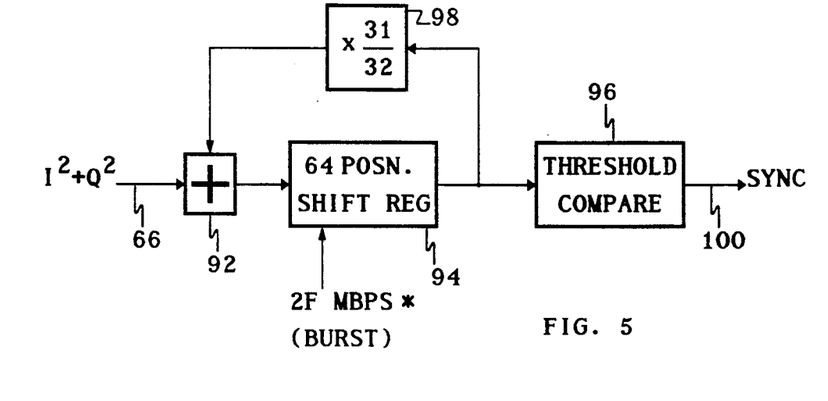
FIG. 5 a block diagram of a sync detector for use in the receiver of FIG. 2.

The sync detector includes an adder circuit 92, a 64-position shift register 94, a threshold compare circuit 96, and a feedback multiplier circuit 98. The $I^2+Q^2$ signal on line 66 appears as a burst of sixty-four digital quantities, at the half-chip cycle rate, and in the last segment of each data symbol interval. These digital quantities are input to the adder circuit 96, the output of which feeds into the first position of the 64-position shift register 94. The last position of the register 94 feeds back to the adder circuit, through the feedback multiplier 98, and also supplies output to the threshold compare circuit 96. After the first burst of input quantities, the shift register 94 is filled with these quantities. After the next burst, corresponding to a second symbol interval, the register contains an accumulated set of data quantities. Operation of the adder circuit 92 and shift register 94 is similar to that of the 64×11 comparator, except that the multiplier 98 gives less weight to the accumulated totals than to the newly arriving values. In the presently preferred embodiment, the multiplier has a value less than unity and equal to the fraction 31/32. After a selected number of symbol intervals of data have been processed, such as thirty, the accumulated data quantities are gated through the threshold compare circuit 96, using a gating arrangement similar to the AND gate 90 in FIG. 4, but with a timing signal that enables the gate only during the 30th data burst. The accumulated data values for thirty consecutive symbols are shown by way of example in the last trace of FIG. 8, in which the broken line indicates the preselected threshold imposed by the threshold compare circuit 96. What appears at the output of the threshold compare circuit 96, on line 100, is a filtered set of sync signals, corresponding only to the correlation peaks above the preselected threshold. The timing of each sync signal is indicative of a separate transmission medium multipath, and is used to select meaningful data from the data demodulation process that is performed in parallel with sync detection.

Figure 6:
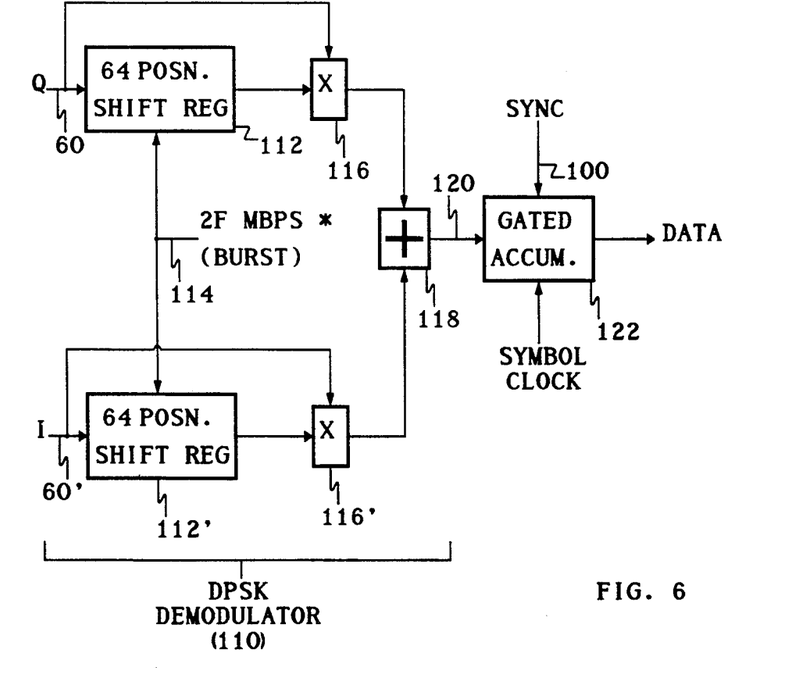
FIG. 6 is a block diagram of a differential phase shift keying (DPSK) data demodulator and multipath combiner used in the receiver of FIG. 2.

Data demodulation is performed using a digital implementation of a DPSK demodulator circuit 110 (FIG. 6). The Q and I data quantities input on lines 60 and 60' are input to two 64-position shift registers 112, 112', clocked by bursts of timing signals at the half-chip rate, as indicated by line 114. The output of each register 112, 112' is connected to a multiplier circuit 116, 116', the other input of which is derived from the Q and I input lines 60, 60'. Thus, each input quantity is multiplied by its counterpart in the previous burst of inputs, i.e. associated with the previous data symbol. The outputs of the multipliers are added together in an adder circuit 118.

The multipliers 116, 116' and the adder 118 together perform a running dot product of the two digital representations of I and Q, in accordance with the formula: $(Symbol_s \sin) \times (Symbol_{s+1} \sin) + (Symbol_s \cos) \times (Symbol_{s+1} \cos)$ The output of the adder 118, on line 120, consists of a burst of sixty-four data values for each data symbol interval. Clearly, some of these values will be derived from noise and will be of no interest. The only data values of interest will be those that correspond in time with the occurrence of correlation peaks generated in the PN demodulation process. These output values will be a decoded DPSK data bit with an amplitude proportional to the strength of the particular signal path to which it corresponds.

The final step in demodulation is to input the data values on line 120 to a gated accumulator 122, which is initially cleared by the symbol clock signal, on line 124, and is gated to receive and accumulate data only upon the occurrence of sync signals on line 100. This is the process of multipath combining in accordance with the invention. The gated accumulator gives each data value a weight corresponding to the amplitude of the signal received over a particular path. At the end of the symbol interval, the gated accumulator contains a value indicative of the data value for symbol, as derived from possible multiple signal paths. This can be converted to a binary quantity, or the data value may be used in a "soft decoding" scheme of some kind.

Figure 7:
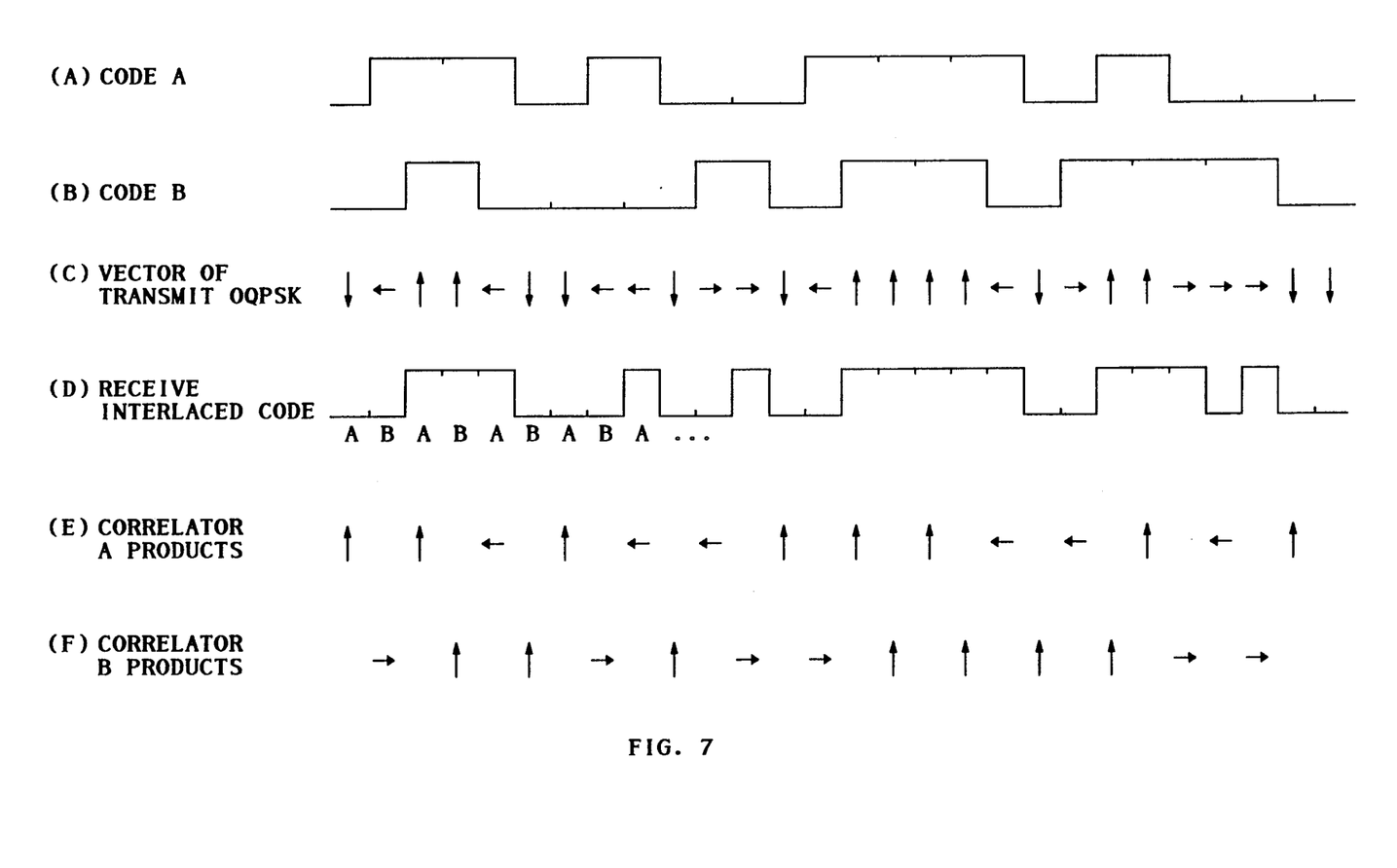
FIGS. 7A through 7F are timing and vector diagrams illustrating the operation of the PN correlator of the invention.

FIGS. 7A-7F depict some illustrative code waveforms and corresponding vector representations that may be helpful in understanding operation of the PN correlation process. FIGS. 7A and 7B are illustrative A and B PN codes, which, it will be observed, can change state at a rate corresponding to the chip rate. Also, the B code transition times are offset from the A code transition times by one half-chip interval to achieve the phase stagger or offset required in staggered or offset QPSK (SQPSK or OQPSK). FIG. 7C shows the vector representation of the transmitted OQPSK signals corresponding to the A and B codes in FIGS. 7A and 7B. It will be seen that there are four phase states corresponding to the four possible combinations of the A and B code states. FIG. 7D shows the waveform of the interlaced A and B codes as generated in the receiver. Note that the interlaced code has possible state transitions at half-chip intervals. Finally, FIGS. 7E and 7F show the correlator A products and correlator B products in vector representation.

An important aspect of the invention is that correlation measurements are maintained in multiple (in this case sixty-four) time bins that can indicate some degree of correlation with signals received over more than one signal path to the receiver. Further, these measurements are maintained separately, but filtered using a threshold as desired, and used to make the best determination of a data value for each received symbol. The principal advantages of the technique of the invention are that multipath signals can be combined to provide a higher quality indication of data, and continuity of communication is assured because signals received over multiple paths are always being processed, rather than selectively discarded.

It will be appreciated from the foregoing that the present invention represents a significant advance in the field of data communications using PN modulation. In particular, the PN correlation technique of the invention provides a measure of correlation for possible multiple signal paths, and these measures of correlation can be used to combine multipath data signals to provide higher quality and more reliable data communication. Although an embodiment of the invention has been described in detail by way of illustration, it will be appreciated that various modifications may be made without departing from the spirit and scope of the invention. Accordingly, the invention should not be limited except as by the appended claims.

I claim:

1. A method for correlating and demodulating received pseudo-noise (PN) modulated signals, to obtain improved performance in the presence of multipath conditions, the method comprising the steps of:
    correlating digitized samples of the received signals with a locally generated PN code sequence, to obtain correlation measurements over a plurality of consecutive time bins covering possible multipath conditions;
    demodulating the received signals to obtain potential baseband data relating to all of the time bins;
    filtering the baseband data based on the correlation data obtained for the plurality of time bins, to obtain usable baseband data associated with correlation measurements indicative or usable signal components; and
    combining the usable baseband data components in proportion to their relative signal strengths;
    whereby simultaneous use of multipath signal components improves overall signal quality and assures continuity of data reception.

2. A method as defined in claim 1, wherein:
    data symbols to be derived from the received signals may change state at a data symbol rate, and each received symbol persists for a data symbol interval;
    the correlating step operates on successive segments of the received signal, wherein there are an integral number of segments in each data symbol interval; and
    the correlating step includes
        correlating a segment of locally generated PN code with a moving segment of the received signal, to obtain a first set of correlation measurements over multiple time bins relating to the signal segment,
        correlating successive segments of the locally generated PN code with successive moving segments of the received signal, to obtain multiple sets of correlation measurements similar to the first set, and
        integrating the first and successive sets of correlation measurements over all of the segments in each data symbol interval.

3. A method as defined in claim 2, wherein the correlating step further comprises the steps of:
    generating from the correlation measurements a set of in-phase (I) and quadrature (Q) signals for each data symbol interval; and
    generating from the I and Q signals a set of correlation magnitude signals approximately proportional to $(I^2+Q^2)$, for each data symbol interval.

4. A method as defined in claim 3, and further comprising the steps of:
    integrating the correlation magnitude signals over a selected number of data symbol intervals;
    detecting peaks in the integrated correlation magnitude signals; and
    generating from the detected peaks a sync signal indicative of relative times of arrival of multipath components of the received signals.

5. A method as defined in claim 4, wherein:
    the step of demodulating the received signals includes deriving multiple data values from the I and Q signals obtained for each data symbol interval, the multiple data values being associated with the times of arrival of the multipath components; and
    the step of combining the usable baseband data components in proportion to their relative signal strengths includes accumulating selected ones of the multiple data values, under control of the generated sync signals, whereby the multiple selected data values are accumulated only if they correspond in time to significant correlation measurements.

6. A method as defined in claim 3, wherein the step of generating sets of correlation magnitude signals approximately proportional to $(I^2+Q^2)$ includes:
    determining the magnitudes of the I and Q signals, without regard to sign; and
    adding the magnitudes of the I and Q signals.

7. For use in a pseudo-noise (PN) modem, a method for processing received radio-frequency (rf) signals that have been modulated using a form of quadriphase phase shift keying (QPSK), with PN codes and with data values, the method comprising the steps of:
    down-converting received rf signals to a lower frequency;
    converting the received signals into two streams of digitized orthogonal components;
    correlating the orthogonal components with a locally generated quadriphase PN code sequences, to produce correlation measurements over a plurality of time bins corresponding to a time segment of the received signals;

integrating the correlation measurements over multiple time segments to provide coherent integrated correlation measurements over each successive data symbol interval;

at the end of each data symbol interval, generating from the integrated correlation measurements in-phase (I) and quadrature (Q) component signals for each of the plurality of time bins, and generating a corresponding set of correlation magnitude signals of which there is one for each of the time bins;

using a DPSK demodulator to derive data values from each pair of I and Q component signals in each set of such signals, whereby data values are derived for each of the time bins, regardless of the possible invalidity of data values in many of the bins;

generating sync signals from the correlation magnitude signals exceeding a preselected threshold, to identify the time bins relating to multiple received signal paths; and combining the data values obtained from the DPSK demodulator, under control of the sync signals, wherein only data values identified by the correlation measurements are combined, and weighted in accordance with their correlation magnitudes, to provide for improved quality and continuity of received data.

8. A method as defined in claim 7, wherein:
data symbols to be derived from the received signals may change state at a data symbol rate, and each received symbol persists for a data symbol interval;
the correlating step operates on successive segments of the received signal, wherein there are an integral number of segments in each data symbol interval; and
the correlating step includes
correlating a segment of locally generated PN codes with a moving segment of the received signal, to obtain a first set of correlation measurements over multiple time bins relating to the signal segment,
correlating successive segments of the locally generated PN codes with successive moving segments of the received signal, to obtain multiple sets of correlation measurements similar to the first set, and
integrating the first and successive sets of correlation measurements over all of the segments in each data symbol interval.

9. A method as defined in claim 8, wherein the step of generating sync signals includes:
integrating the correlation magnitude signals over a selected number of data symbol intervals;
detecting peaks in the integrated correlation magnitude signals that exceed the preselected threshold; and
generating from the detected peaks sync signals indicative of the relative times of arrival of multipath components.

10. A method as defined in claim 7, wherein the step of generating sets of correlation magnitude signals includes:
determining the magnitudes of each pair of I and Q signals, without regard to sign; and adding the magnitudes of the I and Q signals, to provide a correlation magnitude signal approximately proportional to $I^2+Q^2$.

11. Apparatus for correlating and demodulating received pseudo-noise (PN) modulated signals, to obtain improved performance in the presence of multipath conditions, the apparatus comprising:
correlation means, for correlating digitized samples of the received signals with locally generated PN code sequences, to obtain correlation measurements over a plurality of consecutive time bins covering possible multipath conditions;
demodulation means, for demodulating the received signals to obtain potential baseband data relating to all of the time bins;
means for filtering the baseband data based on the correlation data obtained for the plurality of time bins, to obtain usable baseband data associated with correlation measurements indicative of usable signal components; and
signal combining means, for combining the usable baseband data components in proportion to their relative signal strengths;
whereby simultaneous use of multipath signal components improves overall signal quality and assures continuity of data reception.

12. Apparatus as defined in claim 11, wherein:
data symbols to be derived from the received signals may change state at a data symbol rate, and each received symbol persists for a data symbol interval;
the correlation means operates on successive segments of the received signal, wherein there are an integral number of segments in each data symbol interval; and
the correlation means includes
means for correlating successive segments of the locally generated PN code with successive moving segments of the received signal, to obtain multiple sets of correlation measurements over multiple time bins relating to the signal segment, and
means for integrating the successive sets of correlation measurements over all of the segments in each data symbol interval.

13. Apparatus as defined in claim 12, wherein the correlation means further comprises:
means for generating from the correlation measurements a set of in-phase (I) and quadrature (Q) signals for each data symbol interval; and
means for generating from the I and Q signals a set of correlation magnitude signals approximately proportional to $(I^2+Q^2)$, for each data symbol interval.

14. Apparatus as defined in claim 13, and further comprising:
means for integrating the correlation magnitude signals over a selected number of data symbol intervals;
means for detecting peaks in the integrated correlation magnitude signals; and
means for generating from the detected peaks sync signals indicative of the times of arrival of multipath components.

15. Apparatus as defined in claim 14, wherein:
the demodulation means includes means for deriving multiple data values from the I and Q signals obtained for each data symbol interval, the multiple data values being associated with the times of arrival of multipath components; and the means for combining the usable baseband data components in proportion to their relative signal strengths includes means for accumulating selected ones of the multiple data values, under control of the generated sync signals, whereby the multiple selected data values are accumulated only if they correspond in time to significant correlation measurements.

16. Apparatus as defined in claim 13, wherein the means for generating sets of correlation magnitude signals approximately proportional to $(I^2+Q^2)$ includes:

means for determining the magnitudes of the I and Q signals, without regard to sign; and means for adding the magnitudes of the I and Q signals.

17. For use in a pseudo-noise (PN) modem, apparatus for processing received radio-frequency (rf) signals that have been modulated using a form of quadriphase phase shift keying (QPSK) by PN codes and with data values, the apparatus comprising:

frequency conversion means, for down-converting received rf signals to a lower frequency;

means for converting the received signals into streams of digitized sine and cosine components;

means for generating quasriphase PN code sequences;

correlation means, for correlating the sine and cosine components with the locally generated PN code sequences, to produce correlation measurements over a plurality of time bins corresponding to a time segment of the received signals;

means for integrating the correlation measurements over multiple time segments to provide integrated correlation measurements over each successive data symbol interval;

means operable at the end of each data symbol interval, for generating from the integrated correlation measurements in-phase (I) and quadrature (Q) component signals for each of the plurality of time bins, and generating a corresponding set of correlation magnitude signals of which there is one for each of the time bins;

a DPSK demodulator for deriving data values from each pair of I and Q component signals in each set of such signals, whereby data values are derived for each of the time bins, regardless of the possible invalidity of data values in many of the bins;

means for generating sync signals from the correlation magnitude signals exceeding a preselected threshold, to identify the time bins relating to multiple received signal paths; and signal combining means, for combining the data values obtained from the DPSK demodulator, under control of the sync signals, wherein only data values identified by the correlation measurements are combined, and weighted in accordance with their correlation magnitudes, to provide for improved quality and continuity of received data.

18. Apparatus as defined in claim 17, wherein:

data symbols to be derived from the received signals may change state at a data symbol rate, and each received symbol persists for a data symbol interval;

the correlation means operates on successive segments of the received signal, wherein there are an integral number of segments in each data symbol interval; and the correlation means includes means for correlating successive segments of the locally generated PN code sequences with successive moving segments of the received signal, to obtain multiple sets of correlation measurements to obtain multiple sets of correlation measurements over multiple time bins relating to the signal segment, and means for integrating the successive sets of correlation measurements over all of the segments in each data symbol interval.

19. Apparatus as defined in claim 18, wherein the means for generating sync signals includes:

means for integrating the correlation magnitude signals over a selected number of data symbol intervals;

means for detecting peaks in the integrated correlation magnitude signals that exceed the preselected threshold; and means for generating from the detected peaks sync signals indicative of the timing of the detected peaks.

20. Apparatus as defined in claim 17, wherein the means for generating sets of correlation magnitude signals includes:

means for determining the magnitudes of each pair of I and Q signals, without regard to sign; and means for adding the magnitudes of the I and Q signals, to provide a correlation magnitude signal approximately proportional to $I^2+Q^2$.

* * * * *